: US 9,193,869 B2
(45) Date of Patent: Nov. 24, 2015

(54) DYE COMPOUNDS, METHOD OF MAKING THE COMPOUNDS AND INK COMPOSITION EMPLOYING THE COMPOUNDS

(71) Applicant: XEROX CORPORATION, Norwalk, CT (US)

(72) Inventors: Jeffrey H. Banning, Hillsboro, OR (US); Jule W. Thomas, Jr., West Linn, OR (US); Bo Wu, Wilsonville, OR (US); Stephan V. Drappel, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 113 days.

(21) Appl. No.: 13/975,714

(22) Filed: Aug. 26, 2013

(65) Prior Publication Data
US 2015/0057394 A1 Feb. 26, 2015

(51) Int. Cl.
*C09B 57/00* (2006.01)
*C09D 11/328* (2014.01)

(52) U.S. Cl.
CPC ............ *C09B 57/007* (2013.01); *C09D 11/328* (2013.01)

(58) Field of Classification Search
CPC .................................................... C07D 237/02
USPC ........................................................ 544/249
See application file for complete search history.

(56) References Cited

U.S. PATENT DOCUMENTS

| | | | |
|---|---|---|---|
| 4,565,424 A | 1/1986 | Huffman et al. | |
| 5,380,635 A | 1/1995 | Gomez et al. | |
| 5,763,134 A | 6/1998 | Busman et al. | |
| 5,782,966 A | 7/1998 | Bui et al. | |
| 5,959,105 A | 9/1999 | Harada et al. | |
| 6,174,937 B1 | 1/2001 | Banning et al. | |
| 6,309,453 B1 | 10/2001 | Banning et al. | |
| 6,329,128 B1 | 12/2001 | Helland et al. | |
| 6,348,592 B1 | 2/2002 | Ramsden et al. | |
| 6,515,811 B2 | 2/2003 | Ikuhara et al. | |
| 6,605,416 B2 | 8/2003 | Busman et al. | |
| 2010/0025641 A1* | 2/2010 | Jimbo et al. ................... | 252/587 |
| 2010/0071592 A1 | 3/2010 | Tian et al. | |
| 2012/0274700 A1 | 11/2012 | Belelie et al. | |

FOREIGN PATENT DOCUMENTS

| | | |
|---|---|---|
| EP | 1985667 A2 | 10/2008 |
| WO | 2013087631 | 6/2012 |

OTHER PUBLICATIONS

Banning et al., "Dye Compound and Method of Making the Compound", U.S. Appl. No. 13/975,837, filed Aug. 26, 2013.
Banning et al., "Phase Change Inks Containing Wax-Soluble Near-Infrared Dyes", U.S. Appl. No. 13/975,933, filed Aug. 26, 2013.
Pfüller et al., "Sudan Black B: Chemical Structure and Histochemistry of the Blue Main Components", Histochemistry 54, 1977, pp. 237-250.
Park et al., "The Novel Functional Chromophores Based on Squarylium Dyes", Bull. Korean Chem. Soc. vol. 26, No. 3, 2005, pp. 428-432.
Maeda et al., "Near-infrared Absorbing Squarylium Dyes with Linearly Extended π-Conjugated Structure for Dye-sensitized Solar Cell Applications", American Chemical Society, 2011, Abstract Only, 1 page.
Author Unknown, Solvent Soluble Near Infrared Absorption Dye ADS830AT, American Dye Source, Inc., Product Bulletin, Sep. 2006, 1 page.
Author Unknown, Near Infrared Laser Dye for Printing Applications ADS775MI, American Dye Source, Inc., Product Bulletin, Nov. 2004, 1 page.
Author Unknown, Near Infrared Laser Dye for Printing Applications ADS775MP, American Dye Source, Inc., Product Bulletin, Oct. 2006, 1 page.
Author Unknown, Near Infrared Laser Dye for Printing Applications ADS775PI, American Dye Source, Inc., Product Bulletin, Nov. 2004, 1 page.
Author Unknown, Near Infrared Laser Dye for Printing Applications ADS775PP, American Dye Source, Inc., Product Bulletin, Oct. 2006, 1 page.
Author Unknown, Near Infrared Absorption and Fluorescent Dye ADS780HO, American Dye Source, Inc., Product Information, May 2001, 1 page.
Author Unknown, Solvent Soluble Near Infrared Dye ADS798SM, American Dye Source, Inc., Product Information, Jun. 2010, 1 page.
Author Unknown, Near Infrared Laser Dye for Printing Applications ADS800AT, American Dye Source, Inc., Product Bulletin, Oct. 2006, 1 page.

(Continued)

*Primary Examiner* — Deepak Rao
(74) *Attorney, Agent, or Firm* — MH2 Technology Law Group LLP

(57) ABSTRACT

A dye compound of formula 1:

where R and R' are substituents independently selected from the group consisting of a hydrogen atom, $C_1$ to $C_4$ alkyl and a solubilizing moiety comprising a substituted or unsubstituted $C_{10}$ to $C_{70}$ hydrocarbyl group. At least one of R and R' is not a hydrogen atom or $C_1$ to $C_4$ alkyl. R'' and R''' can be independently selected from the group consisting of a hydrogen atom, $C_1$ to $C_6$ alkyl groups or halogens; and X is a squaric acid moiety. A property of the dye compound is that it absorbs radiation having a wavelength in the range of about 700 nm to about 1400 nm.

20 Claims, 1 Drawing Sheet

(56) References Cited

OTHER PUBLICATIONS

Author Unknown, Near Infrared Laser Dye for Printing Applications ADS815EI, American Dye Source, Inc., Product Bulletin, Oct. 2006, 1 page.

Beverina et al., "Squaraine Compounds: Tailored Design and Synthesis towards a Variety of Material Science Applications", Eur. J. Org. Chem., 2010, pp. 1207-1225.

Tatarets et al., Dicyanomethylene Squarylium Dyes Red and Near-infrared Fluorescent Probes for Proteins and Cells, PRLS31, SETA BioMedicals, poster, 1 page.

Vitek et al., Aldrichimica acta, vol. 1, No. 2, 1968, published by the Aldrich Chemical Company, Inc., pp. 1-9.

Yagi et al., "Squaiylium Dyes and Related Compounds", Top Heterocycl Chem, 14, Apr. 2008, pp. 133-181.

Banning et al., "Colorant Compounds", U.S. Appl. No. 14/011,762, filed Aug. 28, 2013.

Banning et al., "Phase Change Inks", U.S. Appl. No. 14/011,763, filed Aug. 28, 2013.

Bello, Kasall A. et al. Near-Infrared-absorbing Squaraine Dyes containing 2,3-Dihydroperimidine Terminal Groups. Journal of Chemical Society, Chemical Communications (5), 452-4 (1993).

Umezawa, et al. Water-soluble NIR fluorescent probes based on squaraine and their application for protein labeling. Analytical Sciences, 24(2), 213-217 (2008).

* cited by examiner

DYE COMPOUNDS, METHOD OF MAKING THE COMPOUNDS AND INK COMPOSITION EMPLOYING THE COMPOUNDS

DETAILED DESCRIPTION

1. Field of the Disclosure

The present disclosure is directed to a near infrared radiation absorbing dye which can be used in a phase change ink composition.

2. Background

In general, phase change inks are in a solid phase at ambient temperature, but exist in a liquid phase at an elevated operating temperature of an ink jet printing device. At the jet operating temperature, droplets of liquid ink are ejected from the printing device and, when the ink droplets contact the surface of a printing media, they solidify to form a printed pattern. Phase change ink methodology is generally described, for example, in U.S. Pat. Nos. 4,889,560; 5,372,852 and 5,827,918, all of which are assigned to the assignee of the present invention and incorporated herein by reference. It is often the case that these phase change inks are wax based.

Near Infrared ("NIR") radiation absorbing dyes are generally well known. In particular, the squaric acid-perimidine moiety is a well know NIR absorbing dye. It is "invisible" in the visible spectrum (i.e., doesn't absorb visible light from 400-700 nm). However, the perimidine coupler employed in the synthesis of the dye is "dimethyl" substituted. Known dye compounds employing this moiety are not wax soluble.

There are a number of potential applications for NIR absorbing dyes possessing wax solubility, including uses in phase change inks. Thus, there is a need for novel wax soluble, NIR absorbing dyes.

SUMMARY

An embodiment of the present disclosure is directed to a dye compound of formula 1:

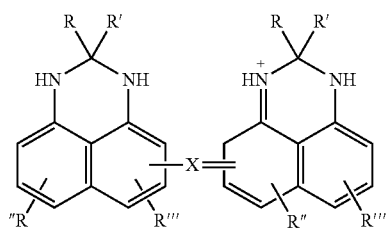
(1)

where R and R' are substituents independently selected from the group consisting of a hydrogen atom, $C_1$ to $C_4$ alkyl and a solubilizing moiety comprising a substituted or unsubstituted $C_{10}$ to $C_{70}$ hydrocarbyl group. At least one of R and R' is not a hydrogen atom or $C_1$ to $C_4$ alkyl. R" and R''' can be independently selected from the group consisting of a hydrogen atom, $C_1$ to $C_6$ alkyl groups or halogens; and X is a squaric acid moiety. A property of the dye compound is that it absorbs radiation having a wavelength in the range of about 700 nm to about 1400 nm.

Another embodiment of the present disclosure is directed to a phase change ink composition. The phase change ink composition comprises a wax; a resin; and a dye compound of formula 1:

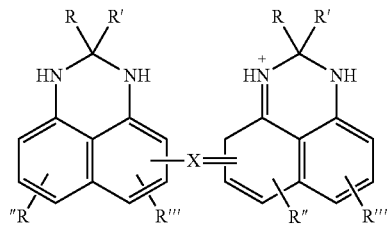
(1)

R and R' are substituents independently selected from the group consisting of a hydrogen atom, $C_1$ to $C_4$ alkyl and a solubilizing moiety comprising a substituted or unsubstituted $C_{10}$ to $C_{70}$ hydrocarbyl group. At least one of R and R' is not a hydrogen atom or $C_1$ to $C_4$ alkyl. R" and R''' can be independently selected from the group consisting of a hydrogen atom, $C_1$ to $C_6$ alkyl groups or halogens, and X is a squaric acid moiety. A property of the dye compound is that it absorbs radiation having a wavelength in the range of about 700 nm to about 1400 nm. The dye compound is soluble in the wax.

Still another embodiment is directed to a method of making a phase change ink compound. The method comprises reacting squaric acid and a second compound of formula 4:

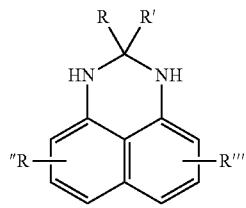
(4)

R and R' are substituents independently selected from the group consisting of a hydrogen atom, $C_1$ to $C_4$ alkyl and a solubilizing moiety comprising a substituted or unsubstituted $C_{10}$ to $C_{70}$ hydrocarbyl group. At least one of R and R' is not a hydrogen atom or $C_1$ to $C_4$ alkyl. R" and R''' are independently selected from the group consisting of a hydrogen atom, $C_1$ to $C_6$ alkyl groups and halogens.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serves to explain the principles of the present disclosure.

Figure 1A:
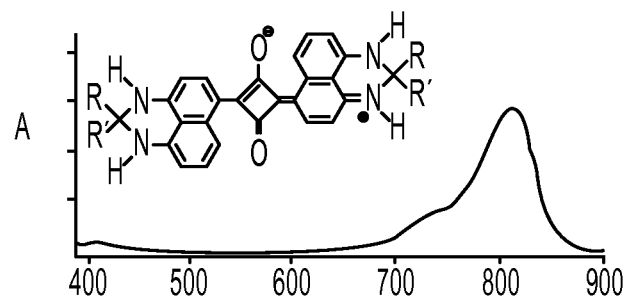
FIG. 1A shows a graph of uv-vis spectrophotometer data for a prior art, dimethyl substituted perimidine compound.

It should be noted that some details of the figure have been simplified and are drawn to facilitate understanding of the embodiments rather than to maintain strict structural accuracy, detail, and scale.

DESCRIPTION OF THE EMBODIMENTS

Dye Compounds

An embodiment of the present disclosure is directed to a dye compound of formula:

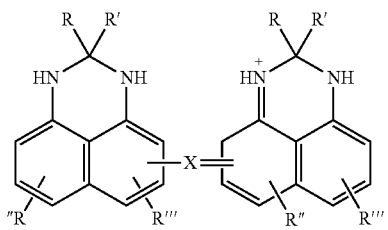

(1)

where R and R' are substituents independently selected from the group consisting of a hydrogen atom, $C_1$ to $C_4$ alkyl, such as methyl or ethyl, or a solubilizing moiety comprising a substituted or unsubstituted $C_{10}$ to $C_{70}$ hydrocarbyl group; wherein at least one of R and R' is not a hydrogen atom or $C_1$ to $C_4$ alkyl; wherein R" and R'" can be independently selected from the group consisting of a hydrogen atom, $C_1$ to $C_6$ alkyl groups, nitro or halogens, such as chloro, flouro or bromo groups; and wherein X can be a squaric group.

Examples of the R and R' solubilizing moieties include $C_{10}$ to $C_{70}$ linear, branched or cyclic alkyl groups; heteroatom containing $C_{10}$ to $C_{70}$ alkyl groups, such as oxyalkyl or ether groups; functional groups, such as carbamates, amides, amines or carboxylate groups, where the functional group has a substituted or unsubstituted $C_{10}$ to $C_{70}$ hydrocarbyl tail; or polymers that include a $C_{10}$ to $C_{70}$ long chain hydrocarbon backbone, such as carbonyl substituted polyethylene or polypropylene. The hydrocarbyl groups of the solubilizing moieties can potentially be substituted with any desired groups, such as carbonyl groups, hydrocarbyl side chains, or any of the functional groups discussed herein.

The structural formula (1) as set forth above is meant to include compounds with the X groups positioned on a perimidine ring in the para and/or ortho position, relative to the amine group. The X groups can be in the same or different position on both perimidine moieties. Thus, for example, compounds of the present disclosure can have squaric acid attached in the ortho position on both perimidine moieties, as shown in the formula 1A, below:

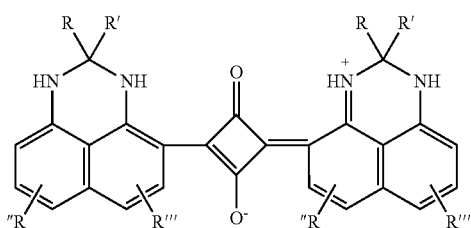

(1A)

or alternatively squaric acid can be attached in the para position on both perimidine moieties, as in formula 1B:

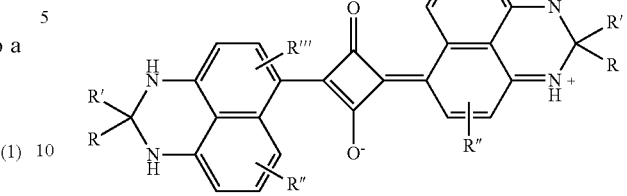

(1B)

or alternatively squaric acid can be positioned ortho on one of the perimidine moieties and para on the other. Any combination of ortho or para positioning is contemplated. It is to be understood that dyes and ink formulations of the present disclosure may include one or more of these isomers. Further, while most of the perimidine dyes of the present disclosure are shown with squaric acid bonds in the ortho position for sake of simplicity, it is understood that the meta and para isomers, as well as isomers with any combination of ortho, meta and para positioning are contemplated for each structural formula.

In an embodiment, one or both of R and R' are carbamate groups. Examples of suitable carbamate groups include compounds of formula 2:

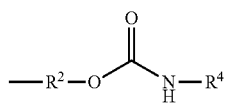

(2)

where $R^2$ is a $C_1$ to $C_4$ alkyl bridge, such as a methylene bridge or ethyl bridge, and $R^4$ is a $C_{12}$ to $C_{25}$ or $C_{50}$ alkyl. In an embodiment, $R^4$ is a $C_{15}$ to $C_{22}$ alkyl, such as n-hexadecyl, n-heptadecyl or n-octadecyl.

In an embodiment, one or both of R and R' are carboxylate groups. Examples of suitable carboxylate groups include substituents of formula 3:

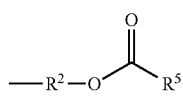

(3)

where $R^2$ is selected from the group consisting of a $C_1$ to $C_4$ alkyl bridge, such as a methylene bridge or ethyl bridge, and $R^5$ is a $C_{12}$ to $C_{25}$ or $C_{50}$ alkyl. In an embodiment, $R^5$ is a $C_{15}$ to $C_{22}$ alkyl, such as n-hexadecyl, n-heptadecyl or n-octadecyl.

In an embodiment, one of both of R and R' are linear, branched or cyclic $C_{10}$ to $C_{70}$ alkyls, such as $C_{12}$ to $C_{25}$ or $C_{50}$ alkyls, or $C_{16}$ to $C_{20}$ alkyls. In an embodiment, one or both of R and R' are selected from the group consisting of n-hexadecyl, n-heptadecyl and n-octadecyl.

Employing the above described R and R' substituent groups on the perimidine coupler can render the dyes of the present disclosure wax soluble. Synthesis reactions for making these wax soluble compounds will be described in more detail below.

In an embodiment, the dye compounds of the present application are thermally stable, which can allow them to be used in solid ink printers that operate at relatively high print-head temperatures. For example, the dye compounds may be suitable for use at printhead temperatures of, for example, 110° C.-135° C. and higher. The dyes can also be employed at lower printhead temperatures. In an embodiment, the dyes can be employed in UV cure systems.

The dyes of the present application can be used in ink compositions for a variety of inkjet printer systems. For example, such dyes can be used in the "PHASER" series of solid inkjet (SIJ), invented and developed at Xerox, OPB (formerly Tektronix, CPID). These solid inkjet printers operate with a heated piezoelectric printhead and use proprietary hot-melt solid inks. Custom-designed materials components that are economically viable are desired in order to achieve optimum solid ink performance. This will continue to be true as inkjet printers move into the higher-speed, higher-resolution C/D class of office and production printers, such as, for example, Xerox's SATURN and JUPITER platforms of Solid Ink Jet (SIJ) printers. Both these printer platforms use modified print-heads that operate at higher temperatures than the PHASER 860 printer, and therefore desirably employ thermally stable and robust ink components and colorants.

In an embodiment, the dye compounds of formula 1 can absorb radiation having a wavelength in the range of about 700 nm, or about 750 nm, to about 1400 nm, also known as near infrared radiation. NIR absorbing dyes are generally known for use in security related applications (e.g., Ink ID or bar codes). Other possible applications include IR leveling applications, in which IR radiation can be applied to the ink droplet during printing, thereby causing it to flow or spread.

Synthesis of Dye Compounds

The present disclosure is also directed to methods of making the dye compounds of formula 1. In an embodiment, the methods can include reacting squaric acid with a perimidine coupler of formula 4:

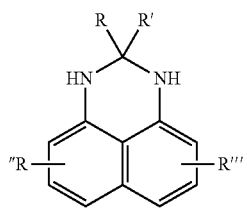

(4)

where R and R' are substituents independently selected from the group consisting of a hydrogen atom, $C_1$ to $C_4$ alkyl, such as methyl or ethyl, or a solubilizing moiety comprising a substituted or unsubstituted $C_{10}$ to $C_{70}$ hydrocarbyl group; wherein at least one of R and R' is not a hydrogen atom or $C_1$ to $C_4$ alkyl; and wherein R" and R'" can be independently selected from the group consisting of a hydrogen atom, $C_1$ to $C_6$ alkyl groups, nitro or halogens, such as chloro, flouro or bromo groups. Any of the solubilizing moieties described herein can be employed as R or R'.

Any suitable method can be used to make the perimidine couplers of formula 4. In one example process, the compound of formula 4 is formed by reacting an isocyanate or carboxylic acid with a hydroxyl substituted perimidine compound of formula 5:

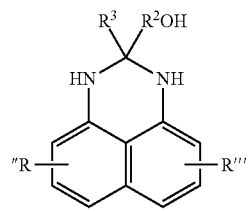

(5)

where $R^3$ is chosen from a hydrogen atom, $C_1$ to $C_4$ alkyl, such as methyl or ethyl, or a hydroxyl group, such as hydroxymethyl or hydroxyethyl; $R^2$ is chosen from a $C_1$ to $C_4$ alkyl bridge, such as a methylene bridge or ethyl bridge; and R" and R'" are defined as above for formula 1.

The isocyanate and carboxylic acid reactants can include $C_{10}$ to $C_{70}$ hydrocarbyl tails that provide the desired solubility. For example, the isocyanates that can be reacted with compounds of formula 5 include those having a general formula 6:

$$OCNR^4 \qquad (6)$$

where $R^4$ is a $C_{10}$ to $C_{70}$ hydrocarbyl tail, such as a $C_{12}$ to $C_{25}$ or $C_{50}$ alkyl, or a linear $C_{15}$ to $C_{19}$ alkyl. Examples of suitable carboxylic acid reactants include those having a general formula 7:

$$R^5COOH \qquad (7)$$

where $R^5$ is a $C_{10}$ to $C_{70}$ hydrocarbyl tail, such as a $C_{12}$ to $C_{25}$ or $C_{50}$ alkyl, or a linear $C_{15}$ to $C_{19}$ alkyl. Example reactions for synthesis of the perimidine couplers of formula 4 using isocyanate and carboxylic acid precursors are illustrated below.

Isocyanate Reactions to Form Carbamate Substituted Perimidines

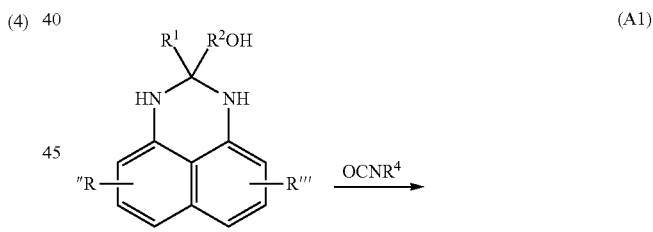

(A1)

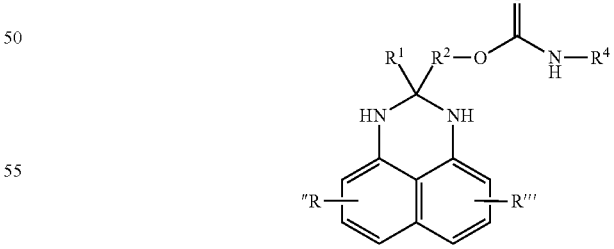

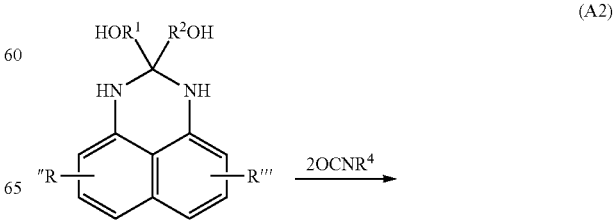

(A2)

-continued

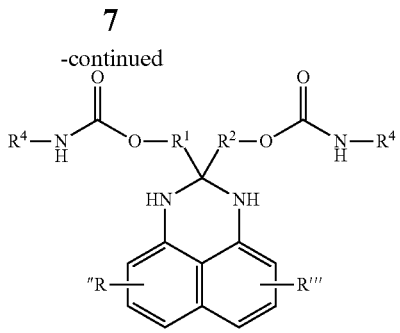

Carboxylic Acid Reactions to Form Carboxylate Substituted Perimidines

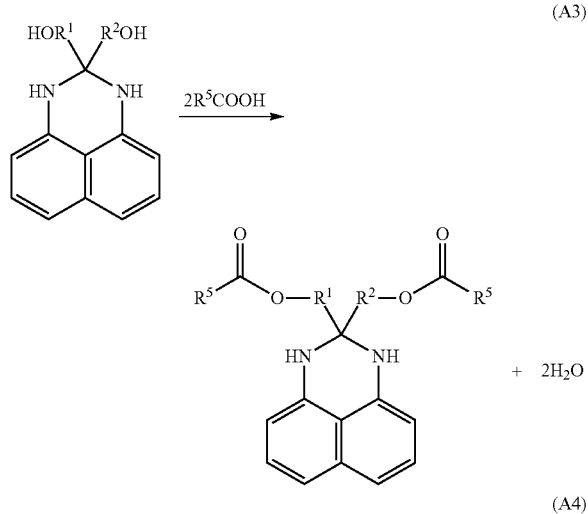

For the reactions A1 to A4 above, $R^1, R^2, R^4, R^5, R''$ and $R'''$ can be defined as set forth above for formulae 4, 5, 6 and 7. In another embodiment, $R^1$ can be selected from the group consisting of a hydrogen atom, methyl or ethyl; $R^2$ is chosen from a methylene bridge or ethyl bridge; $R''$ and $R'''$ are defined as above for formula 4; and $R^4$ and $R^5$ are $C_{15}$ to $C_{22}$ alkyls, such as n-heptadecyl or n-octadecyl. The reactions can occur in any suitable solvent. In some instances, it may be desirable to employ a catalyst and/or to use heat to drive the reaction, as would be understood by one of ordinary skill in the art.

Another example process for forming perimidine couplers of formula 4, where at least one of R and R' is a $C_{10}$ to $C_{70}$ alkyl, includes reacting a 1,8-diaminonaphthalene and a $C_{10}$ to $C_{70}$ alkyl substituted ketone, such as, for example, stearone. Examples of this method, as well as other methods of forming the perimidine couplers of formula 4 can be found in co-pending U.S. Patent Application No., the disclosure of which is incorporated herein by reference in its entirety. Still other methods can be employed to form the perimidine couplers of the present disclosure.

Any of the perimidine couplers discussed herein can be reacted with squaric acid to form the dyes of the present disclosure. Examples of such reactions include the following reactions C, D, and E.

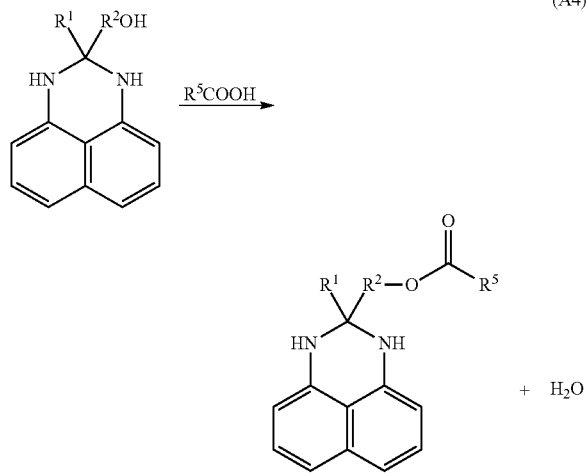

For reaction C, R and R' are solubilizing moieties as defined above for formula 4.

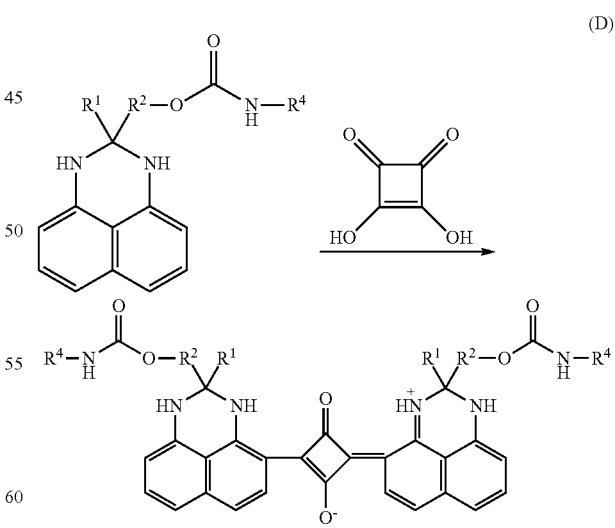

For reaction D, $R^1$ is a $C^1$ to $C^4$ alkyl, such as methyl or ethyl; and $R^2$ and $R^4$ are defined as above in Reactions A1 and A2.

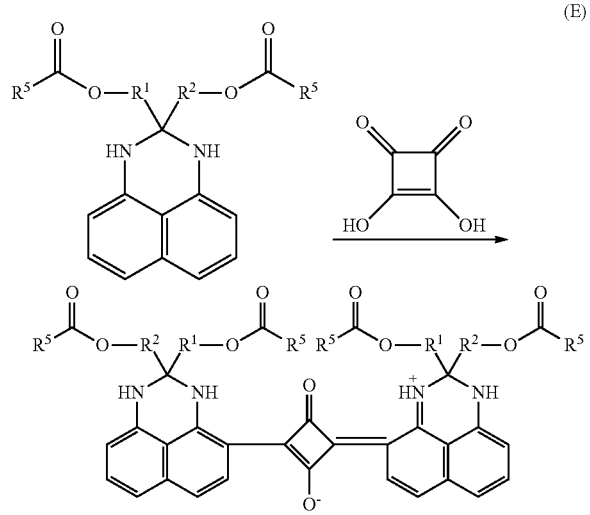

(E)

For reaction E, $R^1$ and $R^2$ are $C_1$ to $C_4$ alkyl bridges, such as a methylene bridge or ethyl bridge, and $R^5$ is as defined above in Reactions A3 and A4.

Any other suitable method for synthesizing or otherwise obtaining the compounds of formula I can be employed. Examples of suitable synthesis methods are described in more detail in co-pending U.S. Application No., the disclosure of which is incorporated herein by reference in its entirety.

Ink Formulations Comprising Dye Compounds

An embodiment of the present disclosure is directed to a phase change ink composition. The phase change inks can comprise a wax; a resin; and any of the dye compounds described herein.

Waxes and Resins

Any waxes suitable for use in phase change ink formulations can be used. Examples of well known waxes include paraffins, carnauba, licowaxa, Montan wax, microcrystalline wax, ester wax, polyethylene wax, stearyl stearamide wax, urethane wax, fatty acids and other waxy materials, and mixtures thereof. In an embodiment, the waxes can include polyethylene wax, stearyl stearamide wax and/or urethane waxes. Examples of urethane waxes are described in U.S. Pat. No. 6,309,453, the disclosure of which is hereby incorporated by reference in its entirety. Triamide and tetraamide waxes can also be employed. An example of a triamide wax is described in Example II of U.S. Pat. No. 6,860,930. An example of a suitable tetraamide wax is disclosed at Example 1 of U.S. Pat. No 6,174,937. The disclosures of U.S. Pat. Nos. 6,860,930 and of 6,174,937 are incorporated herein by reference in their entirety.

Any resins suitable for use in phase change ink formulations can also be used. Examples of well known resins include tetra-amide compounds. Exemplary tetra-amide compounds include those having the general formula 10

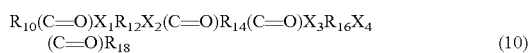

(10)

wherein $X_1$; $X_2$, $X_3$, and $X_4$ are segments comprising atoms selected from group V of the periodic table (i.e., the group comprising nitrogen) and group VI of the periodic table (i.e., the group comprising oxygen and sulfur); wherein at least one of $R_{10}$ and $R_{18}$ comprise at least 37 carbon units; and wherein $R_{12}$, $R_{14}$ and $R_{16}$ each comprise at least one carbon unit. Segments $X_1$; $X_2$, $X_3$, and $X_4$ can be the same, or different than one another. In particular embodiments, $R_{10}$; $R_{12}$, $R_{14}$, $R_{16}$ and $R_{18}$ each comprise carbon and hydrogen. The groups $R_{10}$; $R_{12}$, $R_{14}$, $R_{16}$ and $R_{18}$ can each be, for example, an alkyl group. In further particular embodiments, $R_{10}$ and $R_{18}$ can be the same as one another, and $R_{12}$ and $R_{16}$ can be the same as one another. Triamide resin/waxes, as described in Example II of U.S. Pat. No. 6,860,930 can also be used in such phase change ink formulations A specific example of tetra-amides that can be used are those encompassed by formula 12:

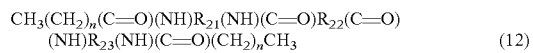

(12)

wherein n is an integer greater than or equal to 36 and less than or equal to 99; and wherein $R_{21}$; $R_{22}$ and $R_{23}$ each comprise at least one carbon unit. In particular embodiments, $R_{21}$; $R_{22}$ and $R_{23}$ consist essentially of carbon and hydrogen, and in such embodiments, $R_{21}$; $R_{22}$ and $R_{23}$ can be, for example, alkyl groups. A more complete description of the compounds of formulae 10 and 11, as well as other tetra-amide compounds that can be employed in the compositions of the present disclosure are described in U.S. Pat. No. 6,174,937, the disclosure of which is hereby incorporated by reference in its entirety.

Other suitable resins include urethane resins, such as those described in U.S. Pat. No. 6,309,453, and U.S. Pat. No. 5,782, 966, the disclosures of both of which are incorporated herein by reference in their entirety.

Colorants

In an embodiment, a colorant can optionally be employed in the inks of the present disclosure. Example colorants can include a dye, a pigment or mixtures thereof. Any dye or pigment may be chosen provided that it is capable of being dispersed or dissolved in the ink carrier and is compatible with the other ink components.

The phase change carrier compositions of the present disclosure can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR (C.I. Solvent Black 35) (ICI); Morton Morplas Magenta 36 (C.I. Solvent Red 172); metal phthalocyanine colorants, such as those disclosed in U.S. Pat. No. 6,221,137 and U.S. Pat. No. 6,472,523, the disclosures of both of which are incorporated herein by reference in their entirety. Polymeric dyes can also be used, such as those disclosed in, for example, U.S. Pat. No. 5,621,022 and U.S. Pat. No. 5,231,135, the disclosures of each of which are hereby entirely incorporated by reference herein, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

In an embodiment, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

Pigments are also suitable colorants for the phase change inks of the present disclosure. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902$_7$, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

If employed, pigment dispersions in the ink base may be stabilized by synergists and dispersants. Any suitable synergists and/or dispersants can be employed. Suitable synergists and dispersants are well known in the art. Examples of suitable dispersants include polyethyleneimine and SOLSPERSE®, available from Lubrizol Corporation. An example of a suitable synergist is SUNFLO SFD-B124, available from Sun Chemicals.

The colorant may be present in the phase change ink in any desired or effective amount to obtain the desired color or hue such as, for example, from about 0.1 percent by weight of the ink to about 50 percent by weight of the ink, or from about 0.2 percent by weight of the ink to about 20 percent by weight of the ink, or about 0.5 percent by weight of the ink to about 10 percent by weight of the ink.

Other Optional Ingredients

Any other ingredients suitable for use in phase change inks can be employed in the formulations of the present disclosure. Examples of such ingredients include tackifiers, antioxidants and viscosity modifying agents.

The ink compositions can be prepared by any suitable method. One of ordinary skill in the art would be able to determine appropriate methods for combining ingredients to form the ink compositions of the present disclosure. For example, the components of the ink carrier can be combined and thoroughly mixed together in any order. The mixture can be heated to at least its melting point, such as, for example from about 60° C. to about 150° C., about 80° C. to about 145° C., or about 85° C. to about 140° C.

When pigments are the selected colorants, the molten mixture may be subjected to grinding in an attritor or media mill apparatus to effect dispersion of the pigment in the ink carrier. The heated mixture can then be stirred for about 5 seconds to about 30 minutes or more, for example, to obtain a substantially homogeneous, uniform melt, followed by cooling the ink to ambient temperature (typically from about 20° C. to about 25° C.).

The resulting inks are solid at ambient temperature. The inks can be employed in an apparatus for direct printing ink jet processes or in indirect (offset) printing ink jet applications. For example, the phase change ink compositions of the present invention can be employed in an ink cartridge for use in inkjet printers, as is well known in the art.

The present disclosure is also directed to a printing method. The method comprises providing an ink jet printing device comprising a phase change ink composition. As described herein above, the phase change ink composition comprises (a) a wax, (b) a resin and (c) a wax soluble dye of formula 1. The phase change ink composition is heated to a temperature above the melting point of the composition to liquefy the ink composition. The liquefied ink composition is jetted from the ink jet printing device onto a substrate to form an image.

In an embodiment, the melted ink can first be jetted onto an intermediate transfer member. The ink can then be transferred from the intermediate transfer member to a final recording substrate. Examples of suitable offset or indirect printing processes are disclosed in, for example, U.S. Pat. No. 5,389,958, the disclosure of which is totally incorporated herein by reference.

In an embodiment, the printing apparatus employs a piezoelectric printing process wherein droplets of the ink are caused to be ejected in an imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks, as disclosed herein, can also be used in printing processes other than hot melt ink jet printing processes.

Any suitable substrate or recording sheet can be employed in the printing processes of the present disclosure. Example substrates include plain papers such as XEROX® 4200 papers, XEROX® Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX® Digital Color Elite Gloss, Sappi Warren Papers LUSTROGLOSS, specialty papers such as XEROX® DURAPAPER, and the like, transparency materials, fabrics, textile products, plastics, polymeric films, inorganic recording mediums such as metals and wood, and the like.

EXAMPLES

Comparative Example

Squaric Acid NIR Dye

Figure 1B:
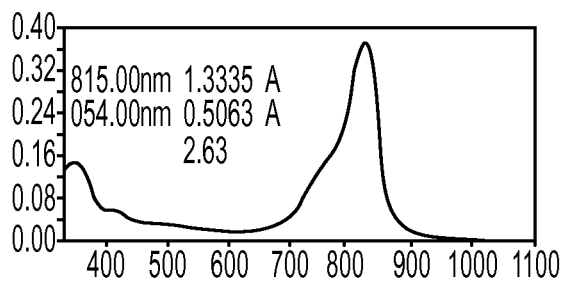
FIG. 1B shows a graph of uv-vis spectrophotometer data for dimethyl substituted perimidine comparison compound.
Figure 2:
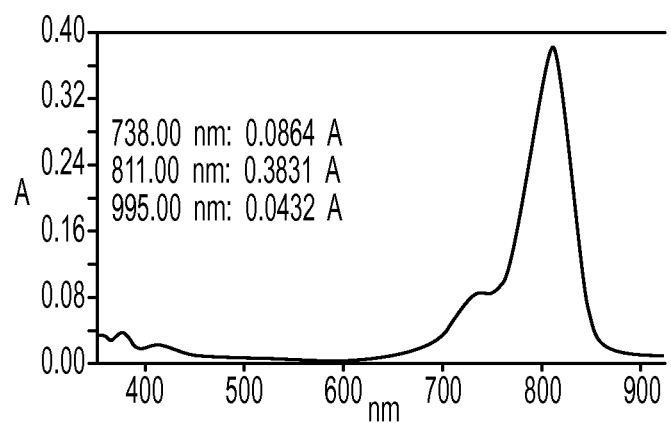
FIG. 2 shows uv-vis spectrophotometer data for an exemplary near infrared radiation absorbing dye compound, according to an embodiment of the present disclosure.

To a 100 ml round bottom flask equipped with Teflon coated stir magnet and a condenser was charged 1 g squaric acid (MW=114) and 45 g butanol. The round bottom flask was placed in an 80° C. oil bath. After squaric acid dissolved about 4.0 g dimethylperimidine (MW=198) was added. The reaction progress was monitored by uv-vis spectrophotometer. The peak at about 815 nm grew and peak at 354 decreased. After 3 hours the absorbance ratio at 815 nm to 353 nm reached the max 2.63. The reaction mixture was cooled in ice after 4.5 hr. The solids were filtered and rinsed with methanol. The structure is believed to be the reaction product shown below based on a comparison of the spectral curve of a prior art squaric acid-perimidine compound (R,R'=methyl), shown in FIG. 1A, and the spectral curve of the present dimethyl substituted compound, shown in FIG. 1B. It is noted that recent spectroscopic data indicates that the attachment of the squaric acid represented by the spectral data is likely ortho to the nitrogen rather than the para structure shown in FIG. 1A, although it is possible a mixture of both isomers is being formed.

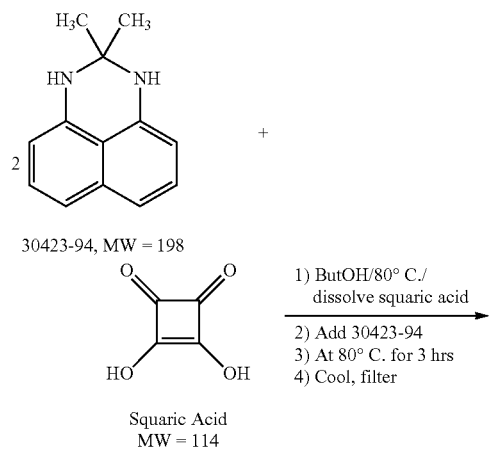

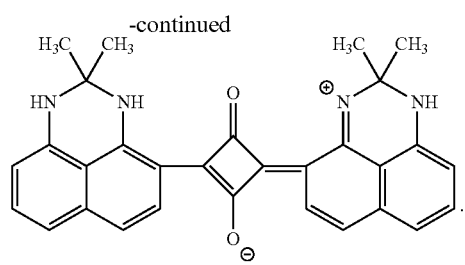

Max absorbance is at 820 nm in DMF

Example 1

Squaric Acid/Distearylperimidine NIR Absorbing Dye

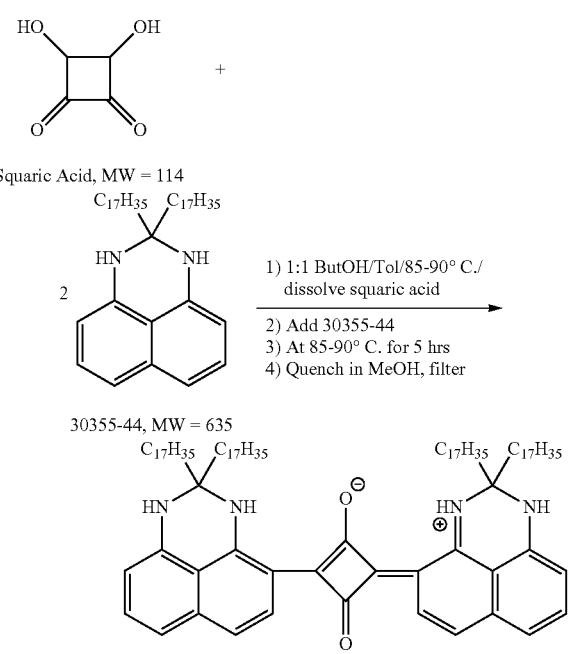

To a 100 ml round bottom flask equipped with Teflon coated stir magnetic and a condenser was charged 2.0 g squaric acid (MW=114), 50 g toluene and 50 g butanol. The round bottom flask was placed in an 80° C. to 90° C. oil bath. After the squaric acid dissolved, 22.3 g distearylperimidine (MW=635) was added. The reaction progress was monitored by uv-vis spectrum, the results of which are illustrated in FIG. 1. The peak at about 811 nm grew and the peak at 355 decreased. After 3.5 hours the absorbance ratio at 811 nm to 355 nm reached the max 11.62. The reaction mixture was quenched in about 400 ml methanol after 5 hrs of reaction. Sticky solids came out and were filtered and rinsed with more methanol three times. The very sticky solids were dissolved in THF and subsequently dried. The yield was about 78%

E=70211 mIA/g @811 nm in toluene To a Physical properties of this compound are shown in Table 1.

Example 2

Preparing Colorless Ink Base

An ink base is prepared by melting, admixing, and filtering the following ingredients: polyethylene wax (PE 655, obtained from Baker Petrolite, Tulsa, Okla., of the formula $CH_3(CH_2)_{50}CH_3$), 43.59 parts by weight; stearyl stearamide wax (KEMAMIDE® S-180, obtained from Crompton Corporation, Greenwich, Conn.), 19.08 parts by weight; tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), (prepared as described in Example 1 of U.S. Pat. No. 6,174,937), 18.94 parts by weight; urethane resin obtained from the reaction of two equivalents of ABITOL® E hydroabietyl alcohol (obtained from Hercules Inc., Wilmington, Del.) and one equivalent of isophorone diisocyanate, (prepared as described in Example 1 of U.S. Pat. No. 5,782,966), 11.71 parts by weight; urethane resin that is the adduct of three equivalents of stearyl isocyanate and a glycerol-based alcohol, (prepared as described in Example 4 of U.S. Pat. No. 6,309,453), 6.48 parts by weight; and NAUGUARD® 445 antioxidant (available from Uniroyal Chemical Co., Middlebury, Conn.), 0.20 parts by weight.

Thereafter, 600 grams of the ink carrier components in the percentages as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER-AID, obtained from Fluka Chemika, Switzerland, and proceeded at a temperature of 135° C. until complete after 6 hours. The colorless ink base was poured into molds, which held about 31 grams of the ink base, and allowed to cool.

Example 3

Preparing Ink with NIR Absorbing Dye

About 30 grams of the Example 4 ink was placed in a 100 mL beaker with a magnetic stir bar and subsequently placed in a 135° C. oil bath until molten. About 0.5 grams of the NIR absorbing dye from Example 2 was then added and stirred for about 3 hours. The essentially colorless ink was then poured into an aluminum mold.

Example 4

Printing of Ink Samples Containing NIR Absorbing Dye

Using a RK Print-Coat Instruments Ltd. K-proofer modified so as to allow heating and melting of the inks, print samples of the inks from Example 5 were produced. These proofs show three different thicknesses of ink coverage on the paper.

Example 5

Squaric Acid/Hydroxymethylperimidine NIR Absorbing Dye

To a 100 ml round bottom flask equipped with Teflon coated stir magnetic and a condenser was charged 1 g squaric acid (MW=114) and 45 g butanol. The round bottom flask was placed in an 80° C. oil bath. After the squaric acid dissolved, 4.0 g of the hydroxyethyl perimidine was added, as shown in the reaction below. The reaction progress was monitored by uv-vis spectrum. The peak at about 812 nm grew and peak at 354 decreased. The reaction was stopped when the 812 nm peak was considered maximized.

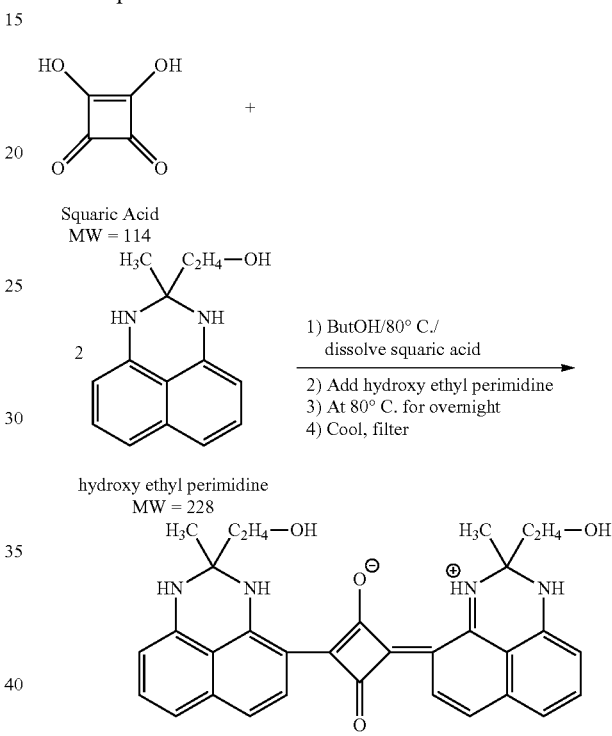

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A dye compound of formula 1:

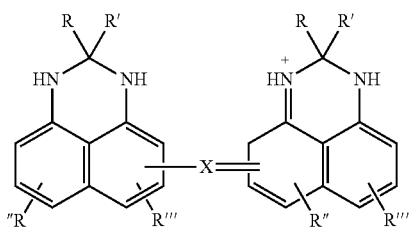

where:
- R and R' are substituents independently selected from the group consisting of a hydrogen atom, $C_1$ to $C_4$ alkyl, $C_{16}$ to $C_{70}$ linear alkyl groups optionally containing one or more heteroatoms; a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone, wherein at least one of R and R' is not a hydrogen atom or $C_1$ to $C_4$ alkyl;
- R" and R'" can be independently selected from the group consisting of a hydrogen atom, $C_1$ to $C_6$ alkyl groups or halogens; and
- X is a squaric acid moiety,
wherein a property of the dye compound is that it absorbs radiation having a wavelength in the range of about 700 nm to about 1400 nm.

2. The compound of claim 1, wherein at least one of R and R' are selected from the group consisting of a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone.

3. The compound of claim 2, wherein at least one of R and R' is a substituent of formula 2:

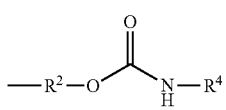

where $R^2$ is a $C_1$ to $C_4$ alkyl bridge and $R^4$ is a $C_{15}$ to $C_{22}$ alkyl.

4. The compound of claim 2, wherein at least one of R and R' is a substituent of formula 3:

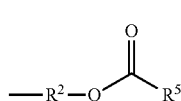

where $R^2$ is a $C_1$ to $C_4$ alkyl bridge and $R^5$ is a $C_{15}$ to $C_{22}$ alkyl.

5. The compound of claim 1, wherein at least one of R and R' is a $C_{16}$ to $C_{20}$ alkyl.

6. The compound of claim 1, wherein R and R' are selected from the group consisting of n-heptadecyl and n-octadecyl.

7. A phase change ink composition, comprising:
a wax;
a resin; and
a dye compound of formula 1:

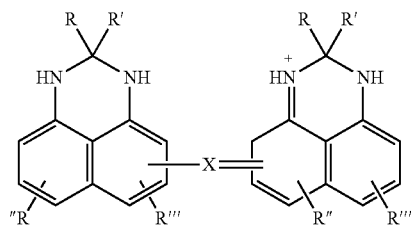

where:
- R and R' are substituents independently selected from the group consisting of a hydrogen atom, $C_1$ to $C_4$ alkyl, $C_{10}$ to $C_{70}$ linear, branched or cyclic alkyl groups optionally containing one or more heteroatoms; a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone, wherein at least one of R and R' is not a hydrogen atom or $C_1$ to $C_4$ alkyl;
- R" and R'" can be independently selected from the group consisting of a hydrogen atom, $C_1$ to $C_6$ alkyl groups or halogens, and
- X is a squaric acid moiety,
wherein a property of the dye compound is that it absorbs radiation having a wavelength in the range of about 700 nm to about 1400 nm, and further wherein the dye compound is soluble in the wax.

8. The composition of claim 7, wherein at least one of R and R' are selected from the group consisting of $C_{16}$ to $C_{70}$ linear alkyl groups containing one or more heteroatoms; a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone.

9. The composition of claim 7, wherein at least one of R and R' is a substituent of formula 2:

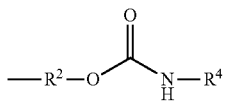

(2)

where $R^2$ is selected from the group consisting of a $C_1$ to $C_4$ alkyl bridge and $R^4$ is a $C_{15}$ to $C_{22}$ alkyl.

10. The composition of claim 7, wherein at least one of R and R' is a substituent of formula 3:

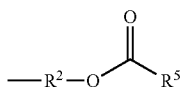

(3)

where $R^2$ is a $C_1$ to $C_4$ alkyl bridge and $R^5$ is a $C_{15}$ to $C_{22}$ alkyl.

11. The composition of claim 7, wherein at least one of R and R' is a $C_{15}$ to $C_{22}$ alkyl.

12. A method of making a phase change ink compound, the method comprising:
reacting squaric acid and a second compound of formula 4:

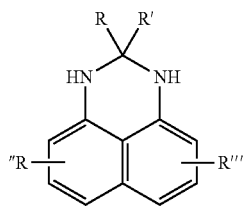

(4)

where R and R' are substituents independently selected from the group consisting of a hydrogen atom, $C_1$ to $C_4$ alkyl, $C_{16}$ to $C_{70}$ linear alkyl groups optionally containing one or more heteroatoms; a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone, wherein at least one of R and R' is not a hydrogen atom or $C_1$ to $C_4$ alkyl; and
R" and R'" are independently selected from the group consisting of a hydrogen atom, $C_1$ to $C_6$ alkyl groups and halogens.

13. The method of claim 12, wherein at least one of R and R' is a $C_{16}$ to $C_{20}$ alkyl.

14. The method of claim 12, wherein the compound of formula 4 is formed by reacting 1,8-diaminonaphthalene and stearone.

15. The method of claim 12, wherein the compound of formula 4 is formed by reacting an isocyanate with a compound of formula 5:

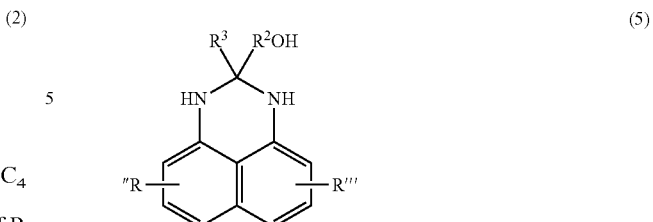

(5)

where $R^3$ is selected from the group consisting of a hydrogen atom, $C_1$ to $C_4$ alkyls and a hydroxyl group; $R^2$ is chosen from a $C_1$ to $C_4$ alkyl bridge; and R" and R'" are as defined in claim 12.

16. The method of claim 15, wherein the isocyanate is $OCNR^8$, where $R^8$ is a linear $C_{16}$ to $C_{19}$ alkyl.

17. The method of claim 12, wherein the compound of formula 4 is formed by reacting a carboxylic acid with a compound of formula 5:

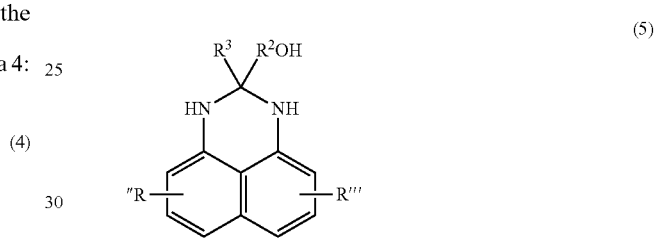

(5)

where $R^3$ is selected from the group consisting of a hydrogen atom, $C_1$ to $C_4$ alkyls and a hydroxyl group; $R^2$ is chosen from a $C_1$ to $C_4$ alkyl bridge; and R" and R'" are as defined in claim 12.

18. The method of claim 17, wherein the carboxylic acid is $R^{10}COOH$, where $R^{10}$ is a linear $C_{15}$ to $C_{17}$ alkyl.

19. The method of claim 12, wherein at least one of R and R' are selected from the group consisting of a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone.

20. The composition of claim 7, wherein at least one of R and R' are selected from the group consisting of a carbamate having a substituted or unsubstituted $C_{10}$ to $C_{70}$ hydrocarbyl tail; an amide having a substituted or unsubstituted $C_{10}$ to $C_{70}$ hydrocarbyl tail; an amine having a substituted or unsubstituted $C_{10}$ to $C_{70}$ hydrocarbyl tail; a carboxylate having a substituted or unsubstituted $C_{10}$ to $C_{70}$ hydrocarbyl tail; and polymers that include a $C_{10}$ to $C_{70}$ long chain hydrocarbon backbone.

* * * * *